3,317,504
POLYMERIZATION OF ETHYLENE UNDER HIGH PRESSURE
Klaus Kinkel, Ludwigshafen (Rhine), Helmut Pfannmueller, Wesseling, Peter Roder, Ludwigshafen (Rhine), Rudi-Heinz Rotzoll, Limburgerhof, Pfalz, Manfred Tittel, Mannheim, Friederich Urban, Limburgerhof, Pfalz, and Wieland Zacher, Ludwigshafen (Rhine), Germany, assignors to Badische Anilin- & Soda-Fabrik Aktiengesellschaft, Ludwigshafen (Rhine), Germany
No Drawing. Filed Aug. 23, 1963, Ser. No. 304,263
Claims priority, application Germany, Aug. 29, 1962, B 68,614
7 Claims. (Cl. 260—94.9)

This invention relates to a process for the polymerization of ethylene at pressures above 1,000 atmospheres in tubular reactors.

It is known that ethylene can be polymerized at pressures above 500 atmospheres at temperatures between 150° and 300° C. with oxygen as the catalyst. It is also known that ethylene can be polymerized under these conditions in the presence of small amounts of hydrogen, hydrocarbons, such as propane, propylene, butane, cyclohexane and toluene, and also alcohols or carbonyl compounds as regulators. Suitable alcohols are aliphatic alcohols, such as methanol, ethanol and butanol. Carbonyl compounds which have already been used as regulators are for example ketones, such as acetone and methyl ethyl ketone, aldehydes, such as acetaldehyde, and esters of aliphatic carboxylic acids, such as ethyl acetate, butyl acetate and vinyl acetate. It is also known that the said process may be carried out in tubular reactors in which the temperature is about 200° to 300° C. These known processes give polyethylenes with densities between about 0.916 and 0.928 g./ccm. Sheets prepared from such polyethylenes scatter light fairly considerably if the polyethylenes have not been after-treated. Moreover, in the said known methods the unreacted ethylene, after the polyethylene has been separated, is recycled to the beginning of the tubular reactor where it is admixed with the ethylene freshly supplied to the reactor. Provided this is done, the conversion is up to 13% by weight with reference to the amount of ethylene passed into the reactor.

It is also known that polyethylenes having densities of 0.924 to 0.925 can be prepared by polymerizing ethylene in a tubular reactor at 170° C. and 1,200 atmospheres in the presence of relatively large amounts of water and benzene, using benzoyl peroxide as catalyst. Polyethylenes are thus obtained, however, whose softening point is only 94° to 96° C. Moreover separation of the water and benzene in this prior art process involves high equipment costs.

Furthermore it is known to polymerize ethylene in a tubular reactor using oxygen as catalyst and acetone or diethyl ketone as regulator at a pressure of 2,100 atmospheres and to heat the reactor by means of a heating jacket with a heating medium whose temperature is 175° C. Although polyethylenes having densities of 0.918 to 0.932 are obtained, the conversion of ethylene to polyethylene is again only up to about 13%. Moreover the polyethylene obtained in this prior art process using oxygen as catalyst has melt indices below 20 g./10 minutes only in the case of densities below 0.928. Polyethylenes having melt indices of more than 20 g./10 minutes cannot, however, be used for most purposes.

It is an object of the present invention to provide a process for the production of polyethylene having a density between 0.91 and 0.94, which process gives an improved ethylene/polyethylene conversion in the polymerization of ethylene in tubular reactors. Another object is to provide a process for the production of polyethylene which has a density between 0.91 and 0.94 and from which sheeting can be prepared which is especially transparent and has a high surface gloss. Other objects will be apparent from the following detailed description.

These objects are achieved by the process of our invention. We have found that high molecular weight polyethylene having a density between 0.91 and 0.94 can be obtained by polymerization of ethylene at temperatures between 150° and 300° C. and pressures between 1,500 and 3,000 atmospheres in a tubular reactor with oxygen as the catalyst and in the presence of a chain transfer agent in a particularly advantageous way by heating the reaction mixture in the reactor to 168° to 174° C. and then immediately cooling it externally through the reactor wall with a coolant whose maximum temperature is 170° C. in such a manner that the temperature of the reaction mixture does not fall below 168° C. The usual chain transfer agents such as hydrogen, hydrocarbons, alcohols and/or carbonyl compounds may be used for the process. The carbonyl compounds do preferably not contain halogen atoms and should not have an acidic reaction. Surprisingly, a conversion of ethylene to polyethylene having a density between 0.91 and 0.94 is achieved by this process which is much higher than the conversion which can be achieved by the prior art methods carried out in the presence of gaseous or liquid regulators. Moreover polyethylenes having a density between 0.91 and 0.94 are obtained by the process according to this invention from which sheets can be prepared without any after-treatment which scatter visible light far less than sheets obtained from polyethylenes prepared by conventional methods which have not been aftertreated.

In the process according to this invention, the reaction mixture (i.e. the mixture of ethylene, oxygen and a small amount of a conventional chain transfer agent) is heated up in the front portion of the tubular reactor attached to the feed for the reaction mixture to 168° to 174° C., usually by heating the reactor wall. Particularly high conversions are achieved when the reaction mixture is heated to 170° to 172° C.

It is surprising that when heating the reaction mixture to 168° to 174° C., preferably 170° to 172° C. it is especially advantageous to heat the reaction mixture from outside through the reactor wall with a heating medium whose temperature is not more than 10° C. above that of the reaction mixture at the end of the heating zone. In general, the difference between the temperature of the reaction mixture at the end of the heating zone of the reactor and the temperature of the heating medium in the heating jacket need not be more than 2° C. In other words, the reaction mixture may be expediently heated through the reactor wall with a heating medium whose temperature is 2 to 10° C. higher than the temperature of the reaction mixture at the end of the heating zone of the reactor. The type of heating medium is not critical. Suitable heating media for the heating zone include liquid and gaseous substances such as water, triethylene glycol, diphenyl oxide, steam and air. Water under pressure is preferred as the heating medium.

From the point at which the reaction mixture has reached a temperature of 168° to 174° C., preferably 170° to 172° C., the tubular reactor is then immediately cooled externally with a coolant whose temperature is not more than 170° C. The temperature of the reaction mixture should, however, not fall below 168° C. and preferably should not fall below 170° C. This is achieved by abstracting through the reaction wall by means of the coolant an amount of heat of about 800 kcal. per kg. of polyethylene formed, i.e. about the heat of polymerization of ethylene. The temperature of the coolant in general lies between 100° and 170° C., preferably between 130° and 160° C. When the reaction mixture is heated, polymerization of ethylene starts at above 168° C. The temperature of the reaction mixture then rises rapidly and considerably by the heat of polymerization which is liberated and may reach 300° C. although cooling is applied externally through the reactor wall from the point at which the temperature of the reaction mixture has reached a maximum of 174° C.

The type of coolant used for external cooling of the reactor wall is not critical for the process. Water under pressure is, however, preferred as coolant because of its heat transfer rate. Cooling may, however, also be effected with air, diphenyl oxide or triethylene glycol.

Oxygen is used as catalyst in the usual amounts. In the front part of the reactor before the reaction mixture is heated up, the concentration of oxygen is $0.5 \times 10^{-3}$ to $0.5 \times 10^{-1}$, preferably $10^{-3}$ to $10^{-2}\%$ by weight with reference to the amount of ethylene. The amounts of hydrogen, hydrocarbons, alcohols and/or carbonyl compounds are usually between 0.01 and 20% by weight with reference to the amount of ethylene. These compounds act as modifiers or chain transfer agents and may be used alone or in combination with each other. If hydrogen is used as a regulator in the process, the amount thereof is preferably 0.02 to 0.2% by weight with reference to the amount of ethylene in the reaction mixture.

The hydrocarbons which can be used as modifiers are in general straight-chain or branched aliphatic, cycloaliphatic or aromatic hydrocarbons having 1 to 8 carbon atoms. They may be saturated or ethylenically unsaturated. Hydrocarbons containing from 3 to 8 carbon atoms and having no acetylenic unsaturation and not more than 1 olefinic double bond are preferred. Examples of especially suitable hydrocarbons are methane, ethane, propane, butane, isobutane, butene-1, pentane, cyclohexane, cyclohexene, heptane, octane, isooctane and toluene. The hydrocarbons may be used in amounts between 0.01 and 15, preferably between 0.1 and 10% by weight with reference to the amount of ethylene in the reaction mixture.

Examples of suitable alcohols are linear or branched aliphatic or cycloaliphatic alcohols having 1 to 10 carbon atoms, especially alkanols and cycloalkanols having 1 to 10 carbon atoms, such as methanol, ethanol, isopropanol, n-butanol, isobutanol, tertiary-butyl alcohol, pentyl alcohol, neopentyl alcohol, n-octanol, 2-ethyl hexanol-1, decyl alcohol and cyclohexanol. Linear or branched alkanols having 1 to 4 carbon atoms are particularly suitable and methanol is the preferred alcohol. These alcohols are used in the process preferably in amounts of 1 to 15% by weight with reference to the amount of ethylene in the reaction mixture.

Examples of suitable carbonyl compounds are carboxylic esters, such as methyl acetate, ethyl acetate and ethyl propionate, anhydrides of carboxylic acids, such as acetic anhydride, aldehydes, such as formaldehyde, acetaldehyde and propionaldehyde, and ketones, such as acetone, methyl ethyl ketone, pentanone-(3), cyclohexanone and acetophenone. Among carbonyl compounds of this type, particularly suitable compounds are alphatic carbonyl compounds having 1 to 4 carbon atoms, especially carbonyl compounds of the general formula $R_1-C-R_2$ in which the substituents $R_1$ and $R_2$ together contain from 0 to 3 carbon atoms and in which $R_1$ stands for a hydrogen atom or a methyl, ethyl, propyl, isopropyl, methoxy or carbomethoxy group and $R_2$ stands for a hydrogen atom or a methyl, ethyl, propyl, isopropyl, butyl, acetyl, acetoxy, methoxy, ethoxy or propoxy group. Examples of particularly suitable carbonyl compounds are methyl, ethyl and propyl formates, methyl acetate, ethyl acetate, methyl propionate, dimethyl carbonate, methyl ethyl carbonate, oxalic acid dimethyl ester, formyl formic acid methyl ester, acetyl formic acid methyl ester, acetic anhydride, formaldehyde, acetaldehyde, propionaldehyde, isobutyraldehyde, n-butyraldehyde, 2-methylpropionaldehyde, acetone, methyl ethyl ketone and diacetyl. The preferred carbonyl compounds are acetone and ethyl acetate. If carbonyl compounds are used, amounts between 0.1 and 5% by weight with reference to the amount of ethylene in the reaction mixture are preferred.

Regulators of the said type can be supplied to the ethylene to be polymerized at reaction pressure or at a lower pressure, for example at 200 or 800 atmospheres.

The density and melt index of the polyethylenes obtained in the process depend on the reaction pressure and on the amounts of oxygen and regulator.

Polyethylenes having densities between 0.91 and 0.94, melting points up to about 120° C. and a particularly narrow molecular weight distribution and which are extremely homogeneous are obtained by the process. They are film-forming and in general have molecular weights from 20,000 to 100,000. Sheets which are prepared in the usual manner from the polyethylenes are particularly transparent and distinguished by high surface gloss, great rigidity and particularly favorable blocking behavior. The polyethylenes also have very good fluidity and may be processed particularly rapidly by the injection molding method. It is possible by the injection molding method to make from the polyethylenes particularly homogeneous and stress-free molded articles which are distinguished by high surface gloss.

The invention is illustrated by the following examples. The parts specified in the examples are parts by weight, unless otherwise specified. Parts by volume bear the same relation to parts by weight as the liter (S.T.P.) to the kilogram.

*Examples 1 to 6*

550,000 parts by volume of ethylene (measured at 20° C. and normal pressure) is passed per hour in admixture with the amounts of oxygen and hydrogen set out in the following table into a tubular reactor. The pressure prevailing in the reactor is also indicated in the table. The reaction mixture is heated up in the heating zone of the reactor to the temperatures given in the table using water under the pressure specified. From the point of the reactor where the reaction mixture has the temperature stated, the reactor wall is cooled externally with water under pressure which has a temperature of 165° to 170° C. In this way the temperature of the reaction mixture is prevented from falling below 168° C. The mixture leaving the reactor and comprising unreacted ethylene, polyethylene and byproducts is worked up conventionally and the unreacted ethylene is recycled to the reactor together with fresh ethylene, oxygen and hydrogen. The yields of polyethylene obtained and the melt viscosity and density of the polyethylene are indicated in the following table.

The columns in the table have the following significance:

A—the number of the example
B—the amount of oxygen per hour measured in parts by volume at S.T.P.
C—the amount of hydrogen per hour measured in parts by volume at S.T.P.
D—the pressure in the reactor in atmospheres
E—the temperature in the heating zone to which the reaction mixture is heated in ° C.
F—the yield of polyethylene in parts per hour
G—the melt index (ASTM 1238/57T)
H—the density in g./ccm.
I—water temperature in the heating zone in ° C.

TABLE

| A | B | C | D | E | F | G | H | I |
|---|---|---|---|---|---|---|---|---|
| 1 | 6 | 750 | 2,100 | 168 | 82 | 1.5 | 0.932 | 172 |
| 2 | 6 | 900 | 2,100 | 170 | 84 | 5 | 0.933 | 175 |
| 3 | 6 | 1,150 | 2,100 | 170 | 85 | 20 | 0.936 | 174 |
| 4 | 6 | 850 | 2,300 | 170 | 97 | 1.5 | 0.932 | 174 |
| 5 | 16 | 1,150 | 2,100 | 171 | 100 | 20 | 0.935 | 173 |
| 6 | 30 | 600 | 2,100 | 170 | 137 | 1.5 | 0.925 | 171 |

Sheets which have been prepared from the resultant polyethylenes in the usual way by blow molding scatter light only about half as much as polyethylene prepared by conventional methods.

For comparison, 550,000 parts by volume of ethylene per hour is polymerized at 2,100 atmospheres using 6 parts by volume per hour of oxygen and 520 parts by volume per hour of hydrogen. The reaction mixture is heated up in the heating zone of the tubular reactor to 200° C. and then cooled with water under pressure at 200° C. until it reaches a temperature of about 270° to 300° C. The yield of polyethylene per hour is only 58 parts and the polyethylene has a density of 0.927 g./ccm. and a melt index of 1.5. If 660 parts by volume of hydrogen per hour be used in the comparative experiment instead of 520 parts by volume per hour, the yield under otherwise identical conditions is 60 parts per hour and the polyethylene has a density of 0.928 g./ccm. and a melt index of 5.

*Example 7*

A mixture of 400,000 parts by volume of ethylene, 5 parts by volume of oxygen and 500 parts by volume of hydrogen (all measured at S.T.P.) is passed per hour into a tubular reactor. The mixture is heated up to 170° to 172° C. in the heating zone of the reactor, water under pressure at 175° C. being used as the heating medium. Immediately from the point of the reactor at which the reaction mixture shows a temperature of 170° to 172° C., the outer wall of the reactor is cooled with water under pressure which has a temperature of 160° C. The temperature of the reaction mixture thus does not fall below 170° C. The mixture leaving the reactor comprises unreacted ethylene, polyethylene and byproducts and is worked up in the usual manner. The yield of polyethylene is 66 parts per hour having a density of 0.930 g./ccm. and a melt viscosity of 1.5.

If only 4 parts by volume of oxygen per hour be used instead of 5 parts by volume, and 30 parts by volume per hour of acetone instead of 500 parts by volume of hydrogen, 72 parts of polyethylene per hour exhibiting the same properties is obtained under otherwise identical conditions.

By using 6 parts by volume instead of 5 parts by volume of oxygen per hour and 125 parts by volume of methanol instead of 500 parts by volume of hydrogen per hour, the yield of polyethylene per hour under otherwise identical conditions is 68 parts having the same properties.

Sheets which have been prepared from these polyethylenes scatter light only about half as much as sheets of polyethylene prepared by conventional methods.

*Example 8*

A mixture of 550,000 parts by volume of ethylene, 4,200 parts by volume of propane and 6 parts by volume of oxygen (all measured at 20° C. and atmospheric pressure) is supplied per hour to a tubular reactor. In the heating zone of the reactor the reaction mixture is heated to 168° C. using water under pressure at 172° C. From the point of the reactor where the reaction mixture reaches a temperature of 168° C., the reactor wall is cooled externally with water under pressure which has a temperature of 165° to 168° C. The temperature of the reaction mixture does not fall below 168° C. The pressure in the reactor is 2,100 atmospheres. By working up the reaction mixture in conventional manner, 70 parts per hour of polyethylene is obtained which has the density 0.929 and the melt index $[\eta]=2$. Sheeting prepared from this polyethylene by the blowing method in conventional manner scatter only about 25% of the light scattered by sheeting of conventional polyethylene.

If a mixture of 550,000 parts by volume of ethylene, 3,200 parts by volume of propane and 6 parts by volume of oxygen be supplied to the tubular reactor and polymerization carried out at 2,100 atmospheres by heating the reaction mixture in the reactor externally through the reactor wall with water under pressure at 200° C., and cooling after the polymerization has been initiated, only 51 parts of polyethylene is obtained which has the density 0.926 and the melt index $[\eta]=2.0$. Sheeting prepared from this polyethylene scatters light only to the extent of 61%.

*Example 9*

550,000 parts by volume of ethylene is passed per hour into a tubular reactor in admixture with 15 parts by volume of ethyl acetate and 6 parts by volume of oxygen, all measured at 20° C. and atmospheric pressure. In the heating zone of the reactor which is under a pressure of 2,100 atmospheres, the reaction mixture is heated to 169° C. with water under pressure at 172° C. From the point of the reactor where the reaction mixture reaches a temperature of 169° C. the reactor wall is cooled externally with water under pressure at 165° to 170° C. The temperature of the reaction mixture does not fall below 168° C. By working up the reaction mixture in conventional manner, 60 parts per hour of polyethylene is obtained which has the density 0.931 and the melt index $[\eta]=1.5$. Sheeting prepared from this polyethylene by the blowing method in conventional manner scatters light only to the extent of 30%.

If 550,000 parts by volume be supplied to the reactor per hour in admixture with 5 parts by volume of ethyl acetate and 6 parts by volume of oxygen, and polymerization carried out at 2,100 atmospheres in conventional manner by heating the reaction mixture in the reactor externally through the reactor wall with water under pressure at 200° C., and cooling after the polymerization has been initiated, only 50 parts of polyethylene is obtained which has a density of 0.928 and the melt index $[\eta]=1.5$. Sheeting prepared from this polyethylene scatters light to the extent of 50%.

We claim:

1. In a process for the production of high molecular weight polyethylene having a density between 0.91 and 0.94 in which ethylene is polymerized in a tubular reactor at a temperature between 150° and 300° C. and a pressure between 1,500 and 3,000 atmospheres and in which there is used a chain transfer agent selected from the group consisting of hydrogen, alkanols and cycloalkanols with 1 to 10 carbon atoms, straight-chain and branched aliphatic cycloaliphatic and aromatic hydrocarbons containing 1 to 8 carbon atoms and aliphatic carbonyl compounds containing 1 to 4 carbon atoms, the improvement which comprises heating the reaction mixture to 168° to 174° C. in a first zone of the tubular reactor through the reactor wall with a heating medium whose temperature is from 2° to 10° higher than said temperature of the reaction mixture at the end of the heating zone of said tubular reactor and then immediately withdrawing heat from the reaction mixture in the following zone through the reactor wall by means of a coolant whose temperature lies between 100° and 170° C., in such a manner that the temperature of said reaction mixture does not fall below 168° C.

2. A process as claimed in claim 1 wherein hydrogen is used as chain transfer agent in an amount of between 0.02 and 0.2% by weight with reference to the amount of ethylene.

3. A process as claimed in claim 1, wherein propane is used as chain transfer agent in an amount of between 0.1 and 10% by weight with reference to the amount of ethylene.

4. A process as claimed in claim 1 wherein methanol is used as chain transfer agent in an amount of between 1 and 15% by weight with reference to the amount of ethylene.

5. A process as claimed in claim 1 wherein acetone is used as chain transfer agent in an amount of from 0.1 to 5% by weight with reference to the amount of ethylene.

6. A process as claimed in claim 1 wherein ethyl acetate is used as chain transfer agent in an amount of from 0.1 to 5% by weight with reference to the amount of ethylene.

7. A process as claimed in claim 1, wherein the reaction mixture is heated in the heating zone to 170° to 172° C.

References Cited by the Examiner

Renfrew, A.: Polythene, Interscience Publishers Inc., New York (1960), TP986. P56 R4 (11, 12 and 66–67 relied on).

JOSEPH L. SCHOFER, *Primary Examiner.*

M. B. KURTZMAN, *Assistant Examiner.*